May 17, 1960 W. E. FELLER 2,936,477
WINDSHIELD WIPER ASSEMBLY
Filed Aug. 26, 1958 2 Sheets-Sheet 1
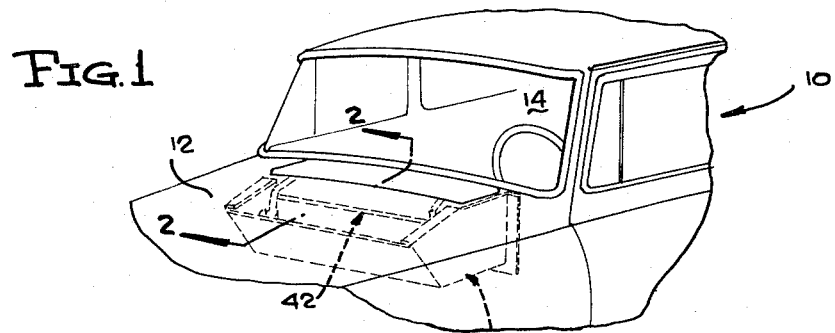
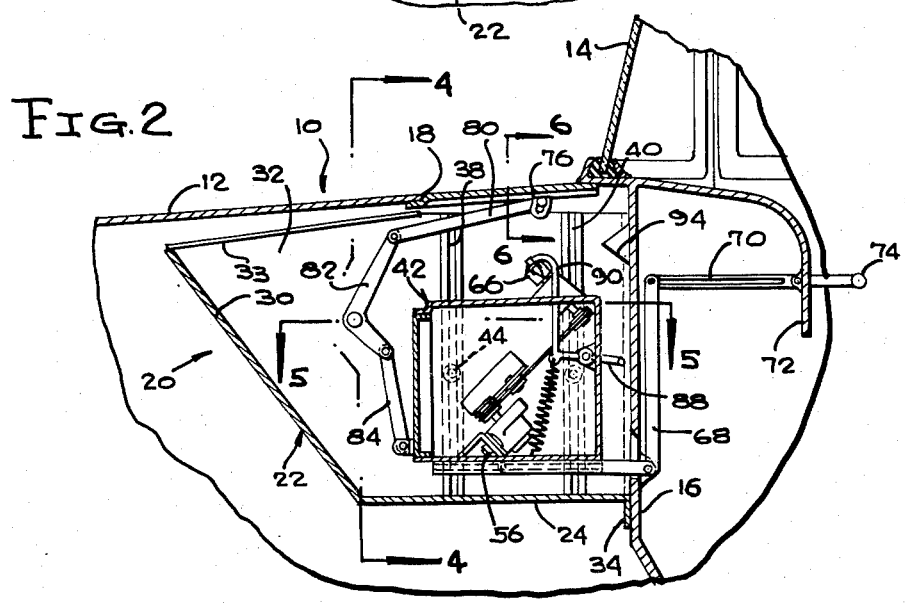
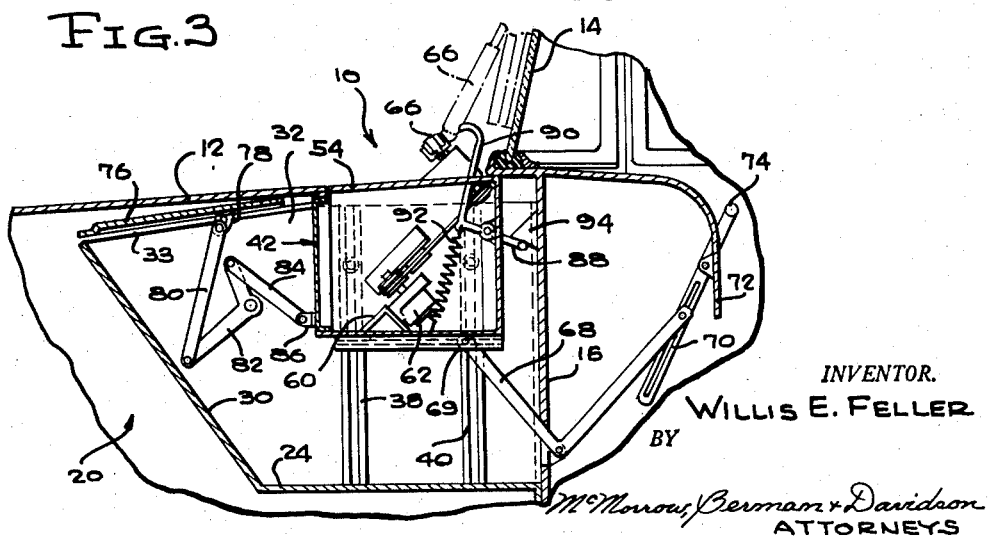
INVENTOR.
WILLIS E. FELLER
BY
McMorrow, Berman + Davidson
ATTORNEYS May 17, 1960  W. E. FELLER  2,936,477
WINDSHIELD WIPER ASSEMBLY
Filed Aug. 26, 1958  2 Sheets-Sheet 2
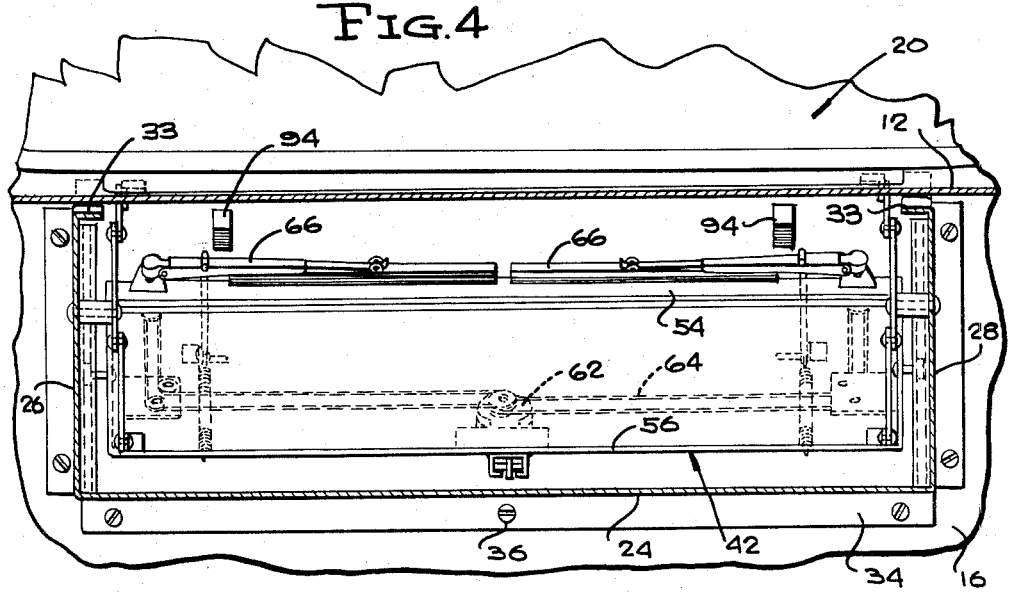
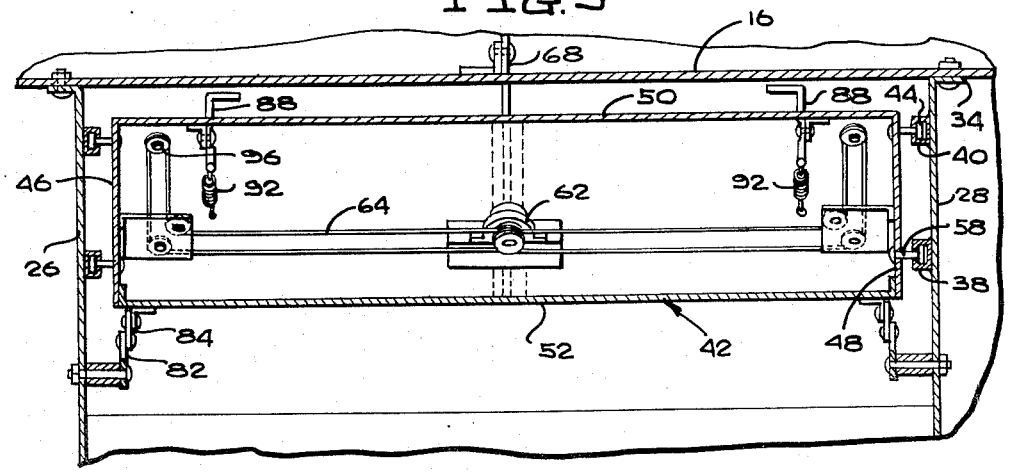
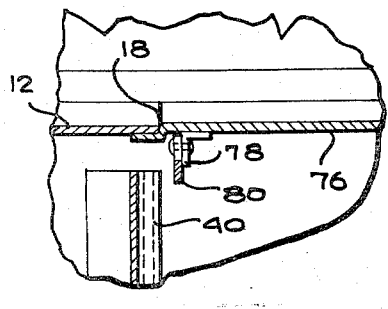
INVENTOR.
WILLIS E. FELLER
BY
McMorrow, Berman & Davidson
ATTORNEYS United States Patent Office 2,936,477
Patented May 17, 1960

2,936,477

WINDSHIELD WIPER ASSEMBLY

Willis E. Feller, Bourbonnais, Ill.

Application August 26, 1958, Serial No. 757,396

3 Claims. (Cl. 15—250.19)

The present invention relates to automotive vehicle windshield wiper assemblies.

An objective of the present invention is to provide a windshield wiper assembly which lends itself to the enhancement of the appearance of an automotive vehicle in which it is installed by being movable from an operative position above the hood of the vehicle to a concealed position beneath the hood.

Another object of the present invention is to provide a windshield wiper assembly which may be installed beneath the hood of an automotive vehicle, such hood having an opening therein and a panel normally closing the opening, the assembly being shiftable to a position closing the opening simultaneously with shifting of the panel out of the closing position with respect to the opening.

A further object of the present invention is to provide a windshield wiper assembly which is simple in structure, sturdy in construction, one which has long-life characteristics due to its position in concealed relation with respect to the hood of an automotive vehicle in which it is installed when not in use, and one which is highly effective in action when in use.

These and other objects and advantages of the present invention will be fully apparent from the following description when taken in conjunction with the annexed drawings, in which:

Figure 1 is a fragmentary view in perspective of a portion of an automobile, the dotted line indicating the assembly of the present invention installed in such automobile;

Figure 2 is a view on an enlarged scale, taken on the line 2—2 of Figure 1, showing the assembly of the present invention in retracted condition;

Figure 3 is a view similiar to Figure 2, showing the assembly of the present invention in operative or extended position;

Figure 4 is a view taken on the line 4—4 of Figure 2;

Figure 5 is a view taken on the line 5—5 of Figure 2; and

Figure 6 is a view, on an enlarged scale, taken on the line 6—6 of Figure 2.

Referring in greater detail to the drawings in which like numerals indicate like parts throughout the several views, the reference numeral 10 designates generally an automobile, shown in fragmentary form, including a hood 12, a windshield 14, and a firewall 16. The hood 12 is provided with an opening 18 extending transversely thereover and adjacent the lower end of the windshield 14 which rises from the hood 12 at the rearward end of the latter. The windshield wiper assembly of the present invention is designated generally by the reference numeral 20 and includes a shell or casing 22 having a bottom 24, side walls 26 and 28 rising from the ends of the bottom 24, a front upwardly sloping wall 30 connecting the adjacent ends of the side walls 26 and 28 together, and an open top 32. A flange 33 extends inwardly from each side wall 26 and 28 at the upper end thereof.

The sidewalls 26 and 28 and the bottom 24 are provided with flanges, as at 34 in Figure 4, by means of which the casing 22 is secured to the firewall 16, there being provided suitable openings in the flanges 34 for the receipt therein of conventional bolts 36.

The inside surfaces of the side walls 26 and 28 are each provided with a pair of spaced vertically extending trackways 38 and 40 each extending from the bottom 24 to a terminating point below and spaced from the opening 18 in the hood 12. A housing 42, constituting a support, is positioned within the casing 22 and has its ends connected by rollers 44 to the trackways 38 and 40 for movement from its position beneath and concealed by the hood 12, in which position it is nested, to a position in which the upper end thereof is contiguous to and bridges the opening 18 in the hood 12.

The housing 42 comprises end walls 46 and 48, a back wall 50, a front wall 52, and a top and bottom 54 and 56, respectively. The rollers 44 are carried on the housing end walls 46 and 48 on the ends of appropriately formed shafts 58. Mounted upon a bracket 60 supported on the housing bottom 56 is a windshield wiper air or electric motor 62 operatively connected by cables 64 to a pair of windshield wiper blades 66 mounted on the ends of the housing top 54. The blades 66 are normally in a horizontally disposed nested position, as shown in Figure 4, when the motor 62 is not operating. Upon actuation of the motor 62 after execution of movement of the housing 42 from the nested position to the position in which the top 54 is contiguous with the opening 18, the blades 66 move to their position in wiping contact with the exterior face of the windshield 14.

Means is provided for effecting by manual or other power means the raising of the housing 42 from the nested position to the operative position. This means consists in an L-shaped lever 68 having the free end of the short leg thereof slidable in a trackway 69 provided on the underface of the housing bottom 56. The other end of the short leg is pivotally mounted in a bracket provided on the rear face of the firewall 16. The aforesaid leg of the lever 68 is vertically movable upwardly and downwardly through a slot provided in the firewall 16. Another lever 70 is connected to the dashboard 72 of the automobile 10 at a point intermediate the ends of the lever 70 for limited swinging movement about a horizontal axis. The lever 70 extends through the dashboard 72 and has a handle 74 on one end thereof accessible to the operator of the automobile 10. The portion of the lever 70 concealed by the dashboard 72 is slotted and the free end of the other leg of the lever 68 is slidably connected to the slot so that upon upward movement of the handle 74 from the position shown in Figure 2 to the position shown in Figure 3, the interconnection of the levers 68 and 70 effects the sliding upward movement of the housing 42 from the nested position to the position in which the top thereof is contiguous with the opening 18.

A panel 76 normally closes the opening 18 in the hood 12 and is mounted in the hood 12 for movement from the closing position to a position away from the opening 18. The casing side wall flanges 33 support the side edges of the panel 76 and a bracket 78 depending from the panel 76 adjacent each side edge thereof is connected for pivotal movement to one end of a first bar 80 which has its other end pivotally connected to the free end of the long leg of an L-shaped lever 82 mounted upon the adjacent side walls 26 and 28. The free end of each of the short legs of each of the levers 82 is connected to one end of a second bar 84 having its other end pivotally connected to a bracket 86 projecting forwardly from the front wall 52 of the housing 42. As will be seen in Figures 2 and 3, the linkage, consisting in the brackets 78 and 86, lever 82, and bars 80 and 84, effects the movement of the panel 76 from its closing position to the position resting upon the flanges 33 in response to execution of movement of the housing 42 from the nested position to the position in which the top 54 of the housing 42 is contiguous to and bridges the opening 18 in the hood 12.

Means is provided for shifting each of the wiper blades 66 from the operative position shown in Figure 3 to the horizontal nested position shown in Figure 2 upon de-energization of the motor 62. Frequently, conventionally arranged air motors for windshield wipers fail to return the blades to the fully nested position. The present invention provides on the inner surface of the housing back wall 50 a trunnion supporting the intermediate portion of a lever 88 having an extension 90 on one end thereof, the extension 90 being curved to the shape of a hook at its upper end. A coil spring 92 biases the lever 88 to the position shown in Figure 2 in which the hook portion of the extension 90 overlies and secures the adjacent wiper blade 66 in the horizontal position. An abutment 94 on the forward side of the firewall 16 is positioned so as to engage the adjacent portion of the lever 88 upon execution of movement of the housing 42 upwardly to the operative position. This engagement of the lever 88 releases the adjacent wiper blade 66 by effecting the tilting movement of the lever 88 against the force of the spring 92. Upon initiation of downward movement of the housing 42, the lever 88 will be released, permitting the hook portion of the extension 90 to again engage the adjacent wiper blade 66. As shown in Figures 4 and 5, there is a lever 88 and associated coil spring 92 for each of the wiper blades 66.

In operation, the panel 76 normally closes the opening in the hood 12 and upon actuation of the lever 70 by the handle 74, either by hand or by suitable motor means (not shown) the housing 42 is carried upwardly simultaneously with the movement forwardly of the panel 76 from the position urging and closing the opening to a position away from the opening. The conventional control is then operated to energize the motor 62, the blades 66 having been released from engagement by the hook portion of the adjacent extension 90 on the one end of the lever 88. The blades will be in the dotted line position shown in Figure 3 in wiping contact with the windshield 14 on the exterior face of the latter until such time as the blades are no longer needed. Upon deenergization of the motor 62, the blades 66 will return to their position pointing toward each other more or less horizontally disposed, as shown in full lines in Figure 3. Upon initiation of movement of the housing 42 downwardly, the hook portion of the extension 90 will again engage the adjacent blade 66 and return it to the horizontal nested position upon the top of the housing 42.

Although the blades 66 are shown driven by the cable 64 traveling over a plurality of suitably positioned pulleys 96, other motor means may be used to drive the blades of the windshield wiper of the present invention without departing from the spirit thereof.

What is claimed is:

1. The combination with an automotive vehicle hood having an opening therethrough and a windshield rising from the hood adjacent said opening, of a windshield wiper assembly comprising a casing having an open top and including a pair of side walls fixedly positioned underneath said hood with the open top adjacent to and facing said opening, a horizontally disposed support positioned within said casing and below and spaced from the open top of the latter and connected to the side walls of said casing for movement from the aforesaid position to a position contiguous to said opening, an oscillatory wiper blade connected to said support for movement with the latter, a panel normally closing said opening and mounted in said hood for movement from the closing position to a position away from said opening, and means connecting said panel to said support so that movement of said panel from the closing position to the position away from said opening is responsive to the movement of said support from the position spaced below said opening to the position contiguous to said opening, said blade being in wiping contact with the exterior face of said windshield upon execution of the movement of said support to the position contiguous to said opening.

2. The combination with an automotive vehicle hood having an opening therethrough and a windshield rising from the hood adjacent said opening, of a windshield wiper assembly comprising a casing having an open top and including a pair of side walls fixedly positioned underneath said hood with the open top adjacent to and facing said opening, a horizontally disposed support positioned within said casing and below and spaced from the open top of the latter and connected to the side walls of said casing for movement from the aforesaid position to a position contiguous to said opening, an oscillatory wiper blade connected to said support for movement with the latter, a panel normally closing said opening and mounted in said hood for movement from the closing position to a position away from said opening, and means embodying linkage connecting said panel to said support so that movement of said panel from the closing position to the position away from said opening is responsive to the movement of said support from the position spaced below said opening to the position contiguous to said opening, said blade being in wiping contact with the exterior face of said windshield upon execution of the movement of said support to the position contiguous to said opening.

3. The combination with an automotive vehicle hood having an opening therethrough and a windshield rising from the hood adjacent said opening, of a windshield wiper assembly comprising a casing having an open top and including a pair of side walls fixedly positioned underneath said hood with the open top adjacent to and facing said opening, a horizontally disposed support positioned within said casing and below and spaced from the open top of the latter and connected to the side walls of said casing for movement from the aforesaid position to a position contiguous to said opening, an oscillatory wiper blade connected to said support for movement with the latter, a panel normally closing said opening and mounted in said hood for movement from the closing position to a position away from said opening, means connecting said panel to said support so that movement of said panel from the closing position to the position away from said opening is responsive to the movement of said support from the position spaced below said opening to the position contiguous to said opening, said blade being in wiping contact with the exterior face of said windshield upon execution of the movement of said support to the position contiguous to said opening, and hand actuable means operatively connected to said support for effecting the movement of the latter.

References Cited in the file of this patent

UNITED STATES PATENTS

| | | |
|---|---|---|
| 2,206,822 | Rousseau | July 2, 1940 |
| 2,759,214 | Madunich | Aug. 21, 1956 |

FOREIGN PATENTS

| | | |
|---|---|---|
| 721,465 | Great Britain | Jan. 5, 1955 |